(12) United States Patent
Yu et al.

(10) Patent No.: US 8,844,687 B2
(45) Date of Patent: Sep. 30, 2014

(54) VALVE STRUCTURE OF SHOCK ABSORBER HAVING VARIABLE FLOW CHANNEL

(75) Inventors: Chun Sung Yu, Jeonbuk (KR); Jun Sik Shin, Jeonbuk (KR)

(73) Assignee: Mando Corporation, Gyeonggi-Do (KR)

( * ) Notice: Subject to any disclaimer, the term of this patent is extended or adjusted under 35 U.S.C. 154(b) by 77 days.

(21) Appl. No.: 13/492,005

(22) Filed: Jun. 8, 2012

(65) Prior Publication Data

US 2012/0312648 A1    Dec. 13, 2012

(30) Foreign Application Priority Data

Jun. 9, 2011   (KR) ........................ 10-2011-0055505

(51) Int. Cl.
  *F16F 9/34*   (2006.01)
  *F16F 9/512*  (2006.01)

(52) U.S. Cl.
  CPC ................................... *F16F 9/5126* (2013.01)
  USPC ...................................... 188/280; 188/322.15

(58) Field of Classification Search
  USPC ................................ 188/280, 322.13, 322.15
  See application file for complete search history.

(56) References Cited

U.S. PATENT DOCUMENTS

| | | | | |
|---|---|---|---|---|
| 6,561,326 | B2 * | 5/2003 | Gotz | 188/322.15 |
| 6,918,473 | B2 * | 7/2005 | Deferme | 188/322.15 |
| 7,100,750 | B2 * | 9/2006 | Drees | 188/322.15 |
| 7,255,211 | B2 * | 8/2007 | Gotz et al. | 188/322.22 |
| 7,451,860 | B2 * | 11/2008 | Nevoigt et al. | 188/322.22 |
| 8,201,669 | B2 * | 6/2012 | Ko | 188/280 |
| 2009/0145708 | A1 * | 6/2009 | Kim | 188/322.15 |
| 2011/0214955 | A1 | 9/2011 | Maeda et al. | |
| 2012/0305352 | A1 * | 12/2012 | Yu et al. | 188/275 |
| 2012/0325604 | A1 * | 12/2012 | Kim | 188/322.15 |

FOREIGN PATENT DOCUMENTS

KR    100175747 B1    3/1999

* cited by examiner

*Primary Examiner* — Bradley King
(74) *Attorney, Agent, or Firm* — McDermott Will & Emery LLP

(57) ABSTRACT

Disclosed herein is a valve structure of a shock absorber which forms flow channels in two directions of working fluid passing through the valve structure so as to slow change of damping force when the moving velocity of a piston is changed between a low velocity and a middle and high velocity and forms one of the two flow channels as a variable flow channel to improve ride comfort of a vehicle. The valve structure includes a piston valve assembly installed at the end of the piston rod and operated to generate damping force varied according to moving velocity of a working fluid, and a variable valve assembly moving together with the piston valve assembly to vary damping force to slow change of a damping force curve when the flow velocity of the working fluid is changed between a low velocity and a middle and high velocity.

5 Claims, 3 Drawing Sheets

VALVE STRUCTURE OF SHOCK ABSORBER HAVING VARIABLE FLOW CHANNEL

CROSS-REFERENCE TO RELATED APPLICATION

This application claims the benefit of Korean Patent Application No. 2011-0055505, filed on Jun. 9, 2011 in the Korean Intellectual Property Office, the disclosure of which is incorporated herein by reference.

BACKGROUND

1. Field

Embodiments of the present invention relate to a valve structure of a shock absorber which forms flow channels in two directions of working fluid passing through the valve structure so as to slow change of damping force when the moving velocity of a piston is changed between a low velocity and a middle and high velocity and forms one of the two flow channels as a variable flow channel to improve ride comfort of a vehicle.

2. Description of the Related Art

In general, a damping device damping impact or vibration applied to an axle from the road surface during driving to improve ride comfort is installed in a vehicle, and a shock absorber is used as one such damping device.

The shock absorber is operated according to vibration of the vehicle corresponding to the state of the road surface, and damping force generated from the shock absorber is varied according to operating velocity of the shock absorber, i.e., according to whether or not the operating velocity of the shock absorber is high or low.

Ride comfort and driving stability of the vehicle may be controlled by adjustment of damping characteristics generated from the shock absorber. Therefore, when the vehicle is designed, adjustment of damping force of the shock absorber is important.

A conventional piston valve is designed to have regular damping characteristics at a high velocity, a middle velocity and a low velocity using a single flow channel, and thus, if damping force at the low velocity is lowered to facilitate improvement of ride comfort, damping force at the high and middle velocities may be lowered.

Further, the conventional shock absorber has characteristics in which damping force is exponentially increased at a low velocity and is linearly changed at a middle and high velocity according to flow velocity of the working fluid passing through the single flow channel (i.e., moving velocity of the piston valve), and since a damping force curve is rapidly changed at an inflection point from the low velocity to the middle and high velocity, ride comfort of a vehicle may be lowered.

SUMMARY

Therefore, it is an aspect of the present invention to provide a valve structure of a shock absorber which forms flow channels in two directions of working fluid passing through the valve structure so as to slow change of damping force when the moving velocity of a piston is changed between a low velocity and a middle and high velocity and forms one of the two flow channels as a variable flow channel to improve ride comfort of a vehicle.

Additional aspects of the invention will be set forth in part in the description which follows and, in part, will be obvious from the description, or may be learned by practice of the invention.

In accordance with one aspect of the present invention, a valve structure of a shock absorber which has a cylinder filled with a working fluid and a piston rod provided with one end located within the cylinder and the other end extending to the outside of the cylinder, includes a piston valve assembly installed at the end of the piston rod and operated to generate damping force varied according to moving velocity of a working fluid under the condition that the inside of the cylinder is divided into an upper chamber and a lower chamber, and a variable valve assembly moving together with the piston valve assembly to vary damping force to slow change of a damping force curve when the flow velocity of the working fluid is changed between a low velocity and a middle and high velocity The variable valve assembly may include a hollow housing extending from the lower portion of the piston valve assembly, a connection passage formed within the piston rod so as to communicate the inner space of the housing with the upper chamber, and a variable valve body arranged within the inner space of the housing to allow the working fluid to selectively flow between the upper chamber and the lower chamber according to flow velocity of the working fluid.

The connection passage may extend to the upper portion of the piston valve assembly and communicate with the upper chamber, or may communicate with the upper chamber through an extension passage formed on a piston body.

The variable valve body may move in the vertical direction and opens a flow channel between the upper chamber and the lower chamber to allow the working fluid to flow, if the moving velocity of the piston rod increases and thus the flow velocity of the working fluid increases, and a point of time when the flow channel is opened may coincide with an inflection point from a low velocity section where damping force exponentially increases to a middle and high velocity section where damping force linearly increases in the damping force curve of the piston valve assembly.

Valve support units having an up and down symmetrical structure may be arranged on and under the variable valve body so as to open and close the flow channel by the variable valve body.

From among the valve support units, an upper valve support unit may include an upper washer, an upper retainer and an upper disc from the top and a lower valve support unit may include a lower washer, a lower retainer and a lower disc from the bottom, and the upper retainer and the lower retainer may be formed of an elastic material which is elastically deformable.

The piston valve assembly may include a piston body provided with at least one compression passage through which the working fluid passes when the shock absorber is compressed and at least one rebound passage through which the working fluid passes when the shock absorber is expanded, a compression valve unit arranged on the piston body and generating damping force against pressure of the working fluid having passed through the at least one compression passage, and a rebound valve unit arranged under the piston body and generating damping force against pressure of the working fluid having passed through the at least one rebound passage.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
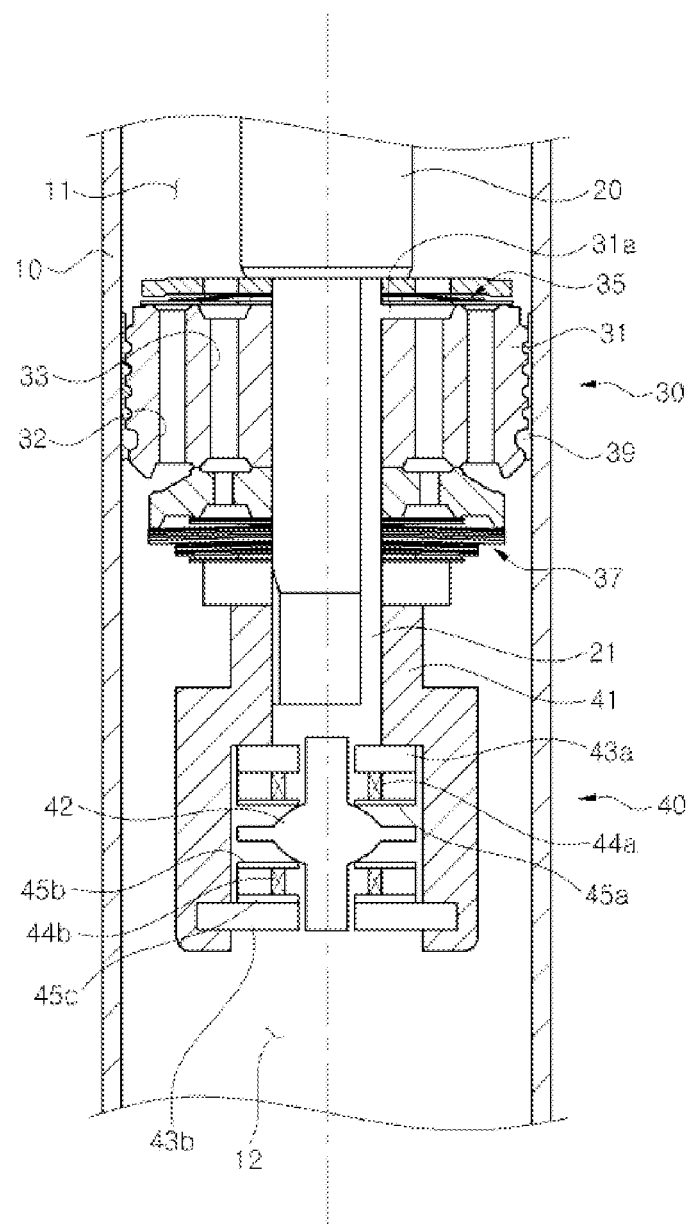
FIG. 1 is a cross-sectional view of a valve structure of a shock absorber in accordance with an embodiment of the present invention.

Reference will now be made in detail to the embodiments of the present invention, examples of which are illustrated in the accompanying drawings, wherein like reference numerals refer to like elements throughout.

Hereinafter, a valve structure of a shock absorber in accordance with an embodiment of the present invention will be described with reference to the accompanying drawings.

As shown in FIG. 1, the shock absorber provided with the valve structure in accordance with the embodiment of the present invention includes a cylinder 10 having a nearly cylindrical shape and filled with a working fluid, such as oil, and a piston rod 20 provided with one end located within the cylinder 10 and the other end extending to the outside of the cylinder 10.

The valve structure of the shock absorber in accordance with the embodiment of the present invention includes a piston valve assembly 30 installed at the end of the piston rod 20 and operated to generate damping force varied according to moving velocity under the condition that the inside of the cylinder 10 is divided into an upper chamber 11 and a lower chamber 12, and a variable valve assembly 40 moving together with the piston valve assembly 30 to vary damping force to slow change of a damping force curve when the flow velocity of the working fluid is changed from a low velocity to a middle and high velocity.

The piston valve assembly 30 and the variable valve assembly 40 are successively installed at the end of the piston rod 20. The other end of the piston rod 20 is slidable on a rod guide and an oil seal and simultaneously passes through the rod guide and the oil seal to achieve liquid tightness and extends to the outside of the cylinder 10.

The piston valve assembly 30 may include a piston body 31 provided with at least one compression passage 32 through which the working fluid passes when the shock absorber is compressed and at least one rebound passage 33 through which the working fluid passes when the shock absorber is expanded, a compression valve unit 35 arranged on the piston body 31 and generating damping force against pressure of the working fluid having passed through the at least one compression passage 32, and a rebound valve unit 37 arranged under the piston body 31 and generating damping force against pressure of the working fluid having passed through the at least one rebound passage 33.

Further, a band 39 made of Teflon to prevent close adhesion with the inner circumferential surface of the cylinder 10 and abrasion of the piston body 31 may be installed on the outer circumferential surface of the piston body 31.

The variable valve assembly 40 includes a hollow housing 41 extending from the lower portion of the piston valve assembly 30, a connection passage 21 formed within the piston rod 20 so as to communicate the inner space of the housing 41 with the upper chamber 11, and a variable valve body 42 arranged within the inner space of the housing 41 to allow the working fluid to selectively flow between the upper chamber 11 and the lower chamber 12 according to flow rate (i.e., flow velocity) of the working fluid.

The connection passage 21 may be formed by milling one side surface of the piston rod 20. The connection passage 21 formed on the piston rod 20 may extend to the upper portion of the piston valve assembly 30, and may communicate with the upper chamber 11 through an extension passage 31a formed on the piston body 31, as shown in FIG. 1.

The variable valve body 42 is formed of a sintered material or a plastic.

The variable valve body 42 moves in the vertical direction and opens a flow channel between the upper chamber 11 and the lower chamber 12 to allow the working fluid to flow, if the moving velocity of the piston rod 20 increases and thus the flow rate of the working fluid increases, i.e., the flow velocity of the working fluid increases. A point of time when the flow channel is opened may coincide with an inflection point from a low velocity section where damping force exponentially increases to a middle and high velocity section where damping force linearly increases in a damping force curve of the piston valve assembly 30.

Valve support units having a nearly up and down symmetrical structure are arranged on and under the variable valve body 42 so as to open and close of the flow channel by the variable valve body 42. An upper valve support unit includes an upper washer 43a, an upper retainer 44a and an upper disc 45a from the top, and a lower valve support unit includes a lower washer 43b, a lower retainer 44b and a lower disc 45b from the bottom. The lower washer 43b is installed at an opening of the housing 41 so that various parts forming the variable valve assembly 40 may be retained within the inner space of the housing 41. Another disc member 45c may be interposed between the lower washer 43b and the lower retainer 44b.

The upper retainer 44a and the lower retainer 44b may be formed of an elastic material which is elastically deformable, i.e., specific synthetic rubber such as nitrile-butadiene rubber (NBR), plastic or a non-metallic material, and when the upper retainer 44a and the lower retainer 44b are deformed, portions of the retainer 44a and the lower retainer 44b supporting the upper disc 45a and the lower disc 45b may be deformed. The upper retainer 44a and the lower retainer 44b may have a shape with an irregular inner diameter so that a hole formed therein has a flower shape or a wave shape, or a shape with grooves separated from each other at a designated angle interval, rather than a doughnut shape having a regular inner diameter, as seen from the plan surfaces thereof.

FIG. 1 illustrates a state in which external force is not applied to the variable valve body 42 or applied external force is smaller than supporting force of the upper and lower valve support units and thus the variable valve body 42 does not move. Here, as shown in FIG. 1, the upper disc 45a and the lower disc 45b contact the upper and lower surfaces of the variable valve body 42, and the upper retainer 44a and the lower retainer 44b maintain an undeformed state.

The central portion of the variable valve body 42 has a nearly spherical or oval shape so as to contact a portion of the upper or lower disc 45a or 45b around the inner diameter thereof to apply pressure to the upper disc 45a or the lower disc 45b.

Hereinafter, operation of the valve structure in accordance with the embodiment of the present invention will be described with reference to FIGS. 2 and 3.

Figure 2:
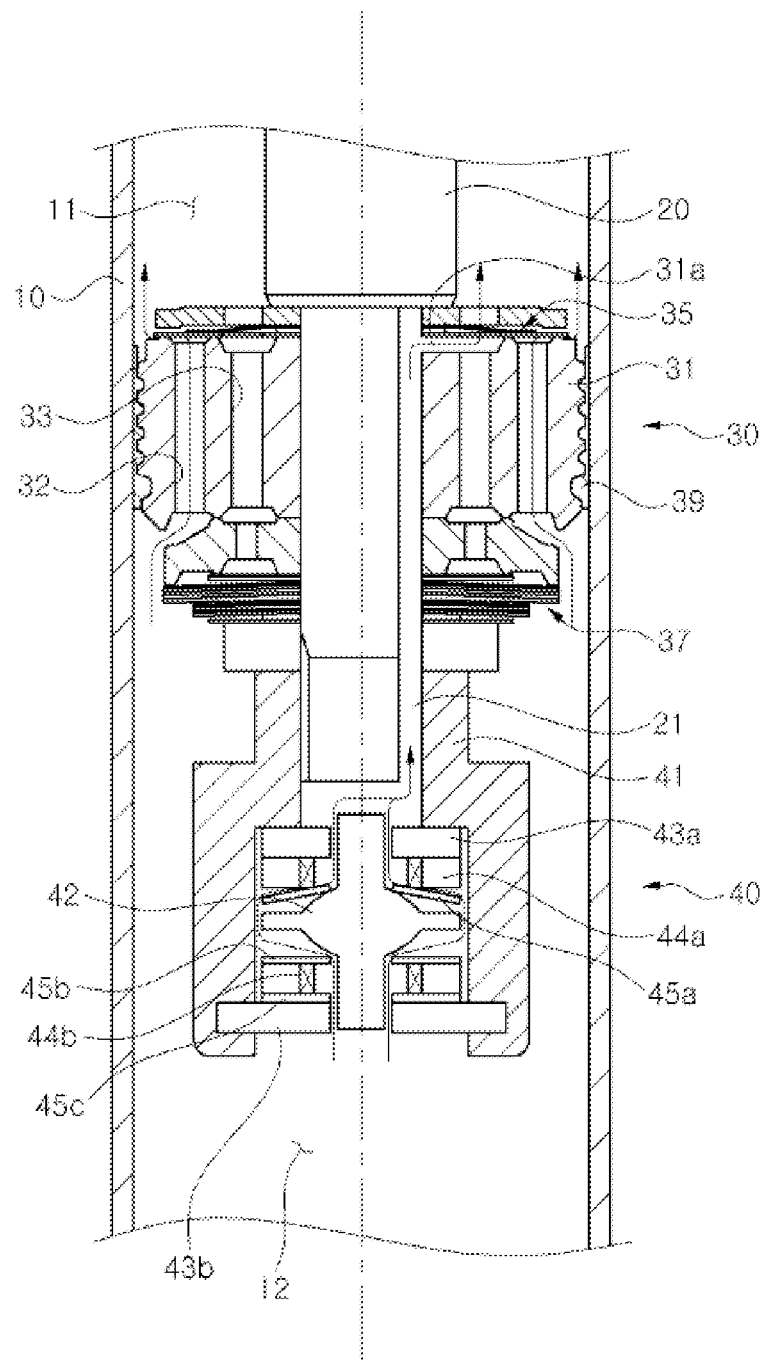
FIG. 2 is a cross-sectional view illustrating flow of a fluid through the valve structure of the shock absorber in accordance with the embodiment of the present invention during a compressing operation.

FIG. 2 illustrates a state of the valve structure in accordance with the embodiment of the present invention during a compressing operation.

If external force, such as pressure of the working fluid, is applied to the variable valve body 42 and thus the variable valve body 42 is compressed, the variable valve body 42 moves upwards. Then, the upper retainer 44a is deformed, the upper disc 45a is deformed, and a flow channel is opened. As shown in FIG. 2, the flow channel is formed between the upper disc 45a and the upper retainer 44a.

Figure 3:
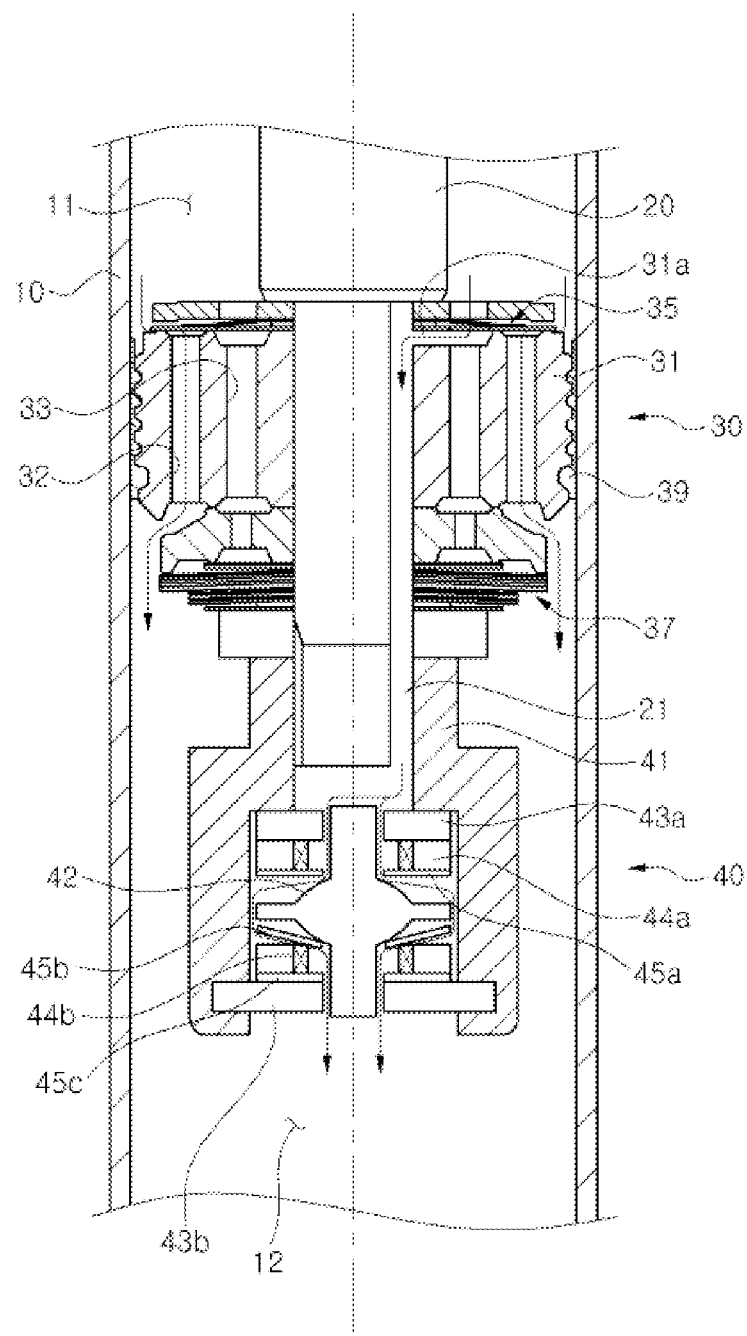
FIG. 3 is a cross-sectional view illustrating flow of the fluid through the valve structure of the shock absorber in accordance with the embodiment of the present invention during an expanding operation.

FIG. 3 illustrates a state of the valve structure in accordance with the embodiment of the present invention during an expanding operation.

If external force, such as pressure of the working fluid, is applied to the variable valve body 42 and thus the variable valve body 42 is expanded, the variable valve body 42 moves downwards. Then, the lower retainer 44b is deformed, the lower disc 45b is deformed, and a flow channel is opened. As shown in FIG. 3, the flow channel is formed between the lower disc 45b and the lower retainer 44b.

As described, according to the operation of the valve structure of the shock absorber in accordance with the embodiment of the present invention, the variable valve assembly 40 is operated so that change of the damping force curve becomes slow when the piston rod 20 moves at a velocity of a designated value or more, i.e., when the flow velocity of the working fluid is changed from a low velocity to a middle and high velocity.

A point of time when the variable valve body 42 moves to open the flow channel may coincide with a point of time when the moving velocity of the piston rod 20 is changed from a low velocity to a middle and high velocity, i.e., an inflection point from a low velocity section where damping force exponentially increases to a middle and high velocity section where damping force linearly increases in a damping force curve of the piston valve assembly 30.

As is apparent from the above description, a valve structure of a shock absorber in accordance with an embodiment of the present invention forms flow channels in two directions of working fluid and forms one of the two flow channels as a variable flow channel.

Thereby, change of damping force when the moving velocity of a piston rod is changed between a low velocity and a middle and high velocity may be slowed, and thus ride comfort of a vehicle may be improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A valve structure of a shock absorber which has a cylinder filled with a working fluid and a piston rod provided with one end located within the cylinder and the other end extending to the outside of the cylinder, the valve structure comprising:
   a piston valve assembly installed at the end of the piston rod and operated to generate damping force varied according to moving velocity of a working fluid under the condition that the inside of the cylinder is divided into an upper chamber and a lower chamber; and
   a variable valve assembly moving together with the piston valve assembly to vary damping force to slow change of a damping force curve when the flow velocity of the working fluid is changed between a low velocity and a middle and high velocity, wherein
   the variable valve assembly includes a hollow housing extending from the lower portion of the piston valve assembly, a connection passage formed within the piston rod so as to communicate the inner space of the housing with the upper chamber, and a variable valve body arranged within the inner space of the housing to allow the working fluid to selectively flow between the upper chamber and the lower chamber according to flow velocity of the working fluid,
   the variable valve body moves in the vertical direction and opens a flow channel between the upper chamber and the lower chamber to allow the working fluid to flow, if the moving velocity of the piston rod increases and thus the flow velocity of the working fluid increases, and
   a point of time when the flow channel is opened coincides with an inflection point from a low velocity section where damping force exponentially increases to a middle and high velocity section where damping force linearly increases in the damping force curve of the piston valve assembly.

2. The valve structure according to claim 1, wherein the connection passage extends to the upper portion of the piston valve assembly and communicates with the upper chamber, or communicates with the upper chamber through an extension passage formed on a piston body.

3. The valve structure according to claim 1, wherein valve support units having a mutually coaxial structure are arranged on upper and lower sides of the variable valve body so as to open and close the flow channel by the variable valve body.

4. The valve structure according to claim 3, wherein:
   from among the valve support units, each upper valve support unit disposed coaxially includes an upper washer, an upper retainer, and an upper disc from the upper side, and each lower valve support unit disposed coaxially includes a lower washer, a lower retainer, and a lower disc from the lower side; and
   each of the upper retainer and the lower retainer is formed of an elastic material which is elastically deformable.

5. The valve structure according to claim 1, wherein:
   the piston valve assembly includes a piston body provided with at least one compression passage through which the working fluid passes when the shock absorber is compressed and at least one rebound passage through which the working fluid passes when the shock absorber is expanded, a compression valve unit arranged on the piston body and generating damping force against pressure of the working fluid having passed through the at least one compression passage, and a rebound valve unit arranged under the piston body and generating damping force against pressure of the working fluid having passed through the at least one rebound passage.

* * * * *